(12) United States Patent
Fritsch et al.

(10) Patent No.: US 7,444,652 B2
(45) Date of Patent: Oct. 28, 2008

(54) PROTECTIVE DEVICE

(75) Inventors: Joseph Frederick Fritsch, 21 The Sweepstakes, Ballsbridge, Dublin (IE) 4; Roxanne Yvonne Fritsch, 21 The Sweepstakes, Ballsbridge, Dublin (IE) 4

(73) Assignees: Joseph Frederick Fritsch, Vancouver, WA (US); Roxanne Yvonne Fritsch, Vancouver, WA (US)

( * ) Notice: Subject to any disclaimer, the term of this patent is extended or adjusted under 35 U.S.C. 154(b) by 280 days.

(21) Appl. No.: 10/971,046

(22) Filed: Oct. 25, 2004

(65) Prior Publication Data

US 2005/0055705 A1  Mar. 10, 2005

Related U.S. Application Data

(63) Continuation of application No. 10/030,043, filed as application No. PCT/IE00/00084 on Jul. 5, 2000, now abandoned.

(30) Foreign Application Priority Data

Jul. 6, 1999 (IE) .................. S99/0560
Jul. 6, 1999 (IE) .................. S99/0561

(51) Int. Cl.
  *G11B 7/08* (2006.01)
  *G11B 33/14* (2006.01)
  *G11B 5/41* (2006.01)
  *G11B 5/40* (2006.01)

(52) U.S. Cl. ................. 720/671; 369/71

(58) Field of Classification Search ................. 720/718, 720/719, 720, 737, 671; 369/71
See application file for complete search history.

(56) References Cited

U.S. PATENT DOCUMENTS

| 5,088,083 | A | | 2/1992 | Olson |
| 5,546,257 | A | | 8/1996 | Jennings |
| 5,966,360 | A | | 10/1999 | Miyazaki et al. |
| 6,028,830 | A | | 2/2000 | Fritsch et al. |
| RE38,390 | E | * | 1/2004 | Onooka et al. .......... 360/254.7 |

FOREIGN PATENT DOCUMENTS

DE  39 25 902 A  3/1990

(Continued)

OTHER PUBLICATIONS

"Lens Protecting Type Compact Inside Drive Lens Cleaner," Dec. 1, 1992, IBM Technical Disclosure Bulletin, vol. No. 35, Iss. No. 7, pp. 487-488.*

*Primary Examiner*—William J Klimowicz

(57) ABSTRACT

A protective device (1) for protecting an optical head (2) of a disc drive unit against dirt and dust and shock when the disc drive unit is not in use comprises a carrier disc (5) similar to a music CD disc for engaging in the disc receiving area of the disc drive unit. A brush member (6) located on the carrier disc (5) at a position corresponding to the inner data track (10) of a music CD disc is provided for engaging a lens (3) and a peripheral portion (7) of a lens carrier (4) of the head (2) when the head (2) is in the inactive position for protecting the lens (3) and the peripheral portion (7) against dirt and dust. Fibers (15) of the brush member (6) embrace the lens (3) when the head (2) is in the inactive position.

16 Claims, 3 Drawing Sheets

Fig. 3

FOREIGN PATENT DOCUMENTS

| | | |
|---|---|---|
| DE | 198 33 577 A | 2/1999 |
| EP | 26 92 90 A1 | 6/1988 |
| EP | 86 08 14 A2 | 8/1998 |
| GB | 22 787 10 A | 12/1994 |
| GB | 2 306 759 A | 5/1997 |
| JP | 62 204 441 A | 9/1987 |
| JP | 63 136 371 A | 8/1988 |
| JP | 05 047 021 A | 2/1993 |
| JP | 05 144 057 A | 6/1993 |
| JP | 06 020 295 A | 1/1994 |
| JP | 06 267 098 A | 9/1994 |
| JP | 07 073 494 A | 3/1995 |
| JP | 07 169 030 A | 7/1995 |
| JP | 08 263 866 A | 10/1996 |
| JP | 10 074 372 A | 3/1998 |
| JP | 10 074 373 A | 3/1998 |
| JP | 63 136 371 A | 6/1998 |
| JP | 10 199 174 A | 7/1998 |
| JP | 10 275 440 A | 10/1998 |
| JP | 10 340 496 A | 12/1998 |
| JP | 11 045 417 A | 2/1999 |
| JP | 11134830 A * | 5/1999 |
| JP | 11 176 035 A | 7/1999 |
| WO | WO 95 240 39 A | 9/1995 |
| WO | WO 98 53455 A | 11/1998 |

* cited by examiner

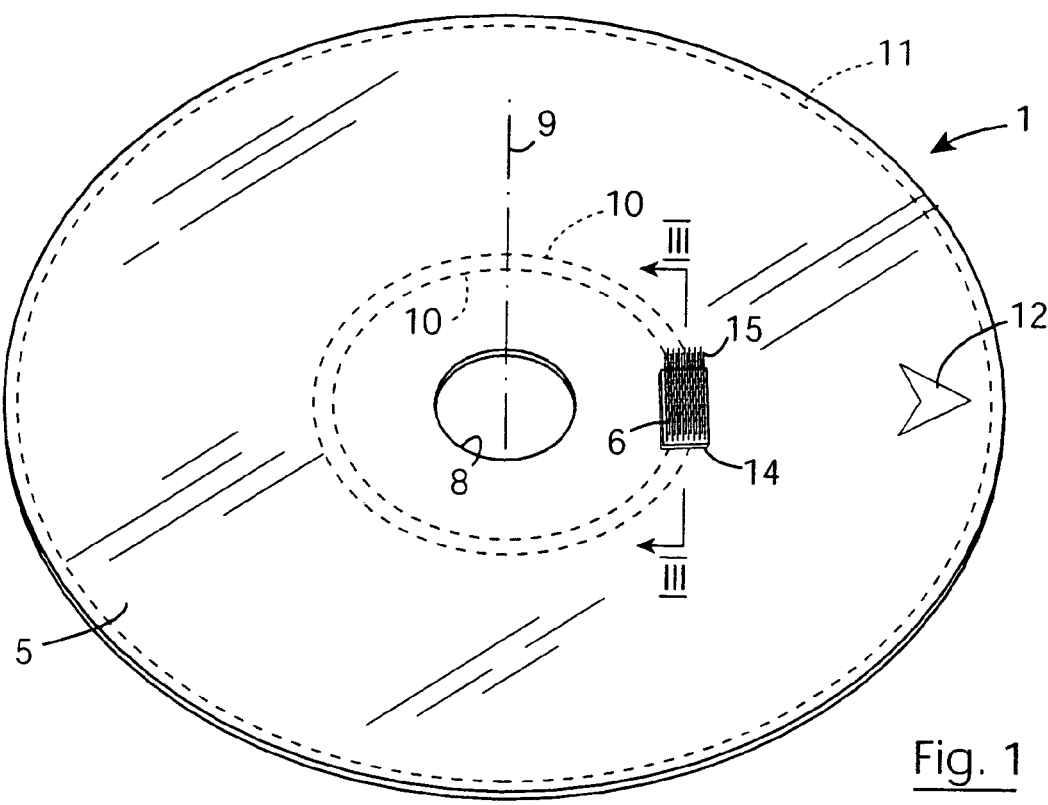
Fig. 1
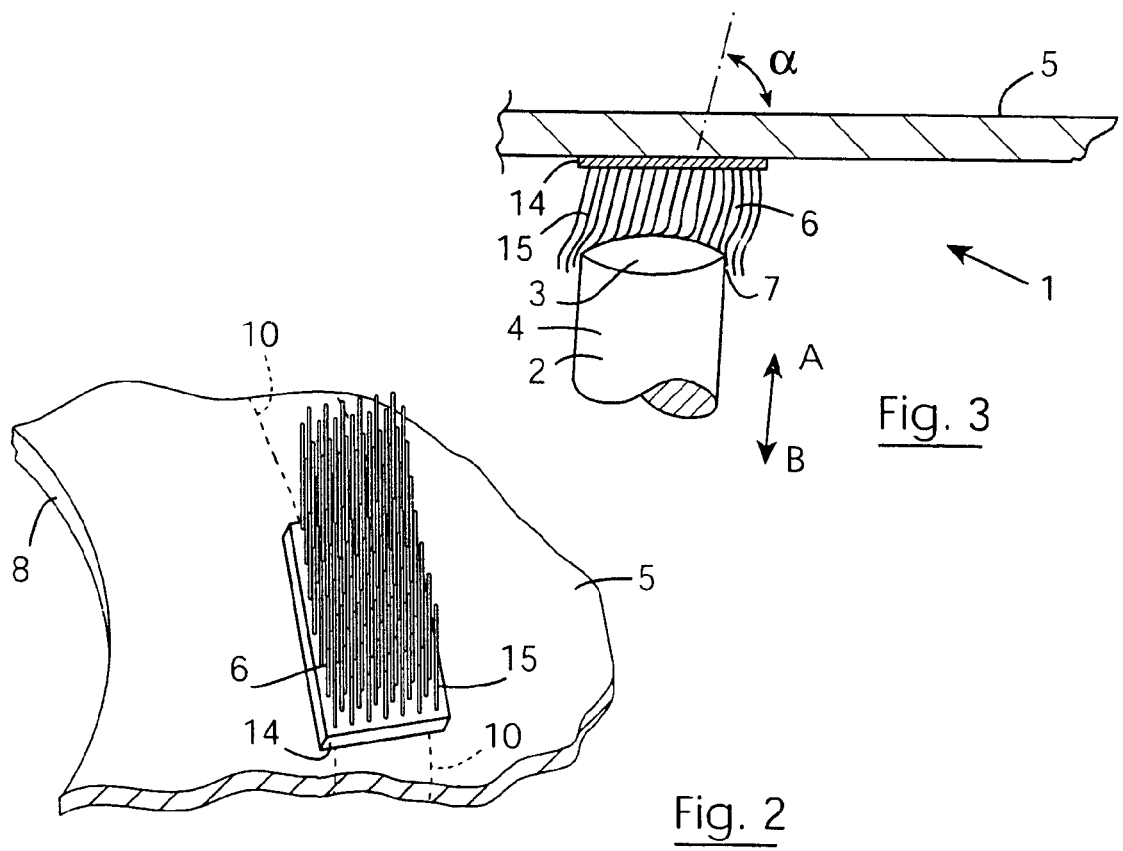
Fig. 3
Fig. 2

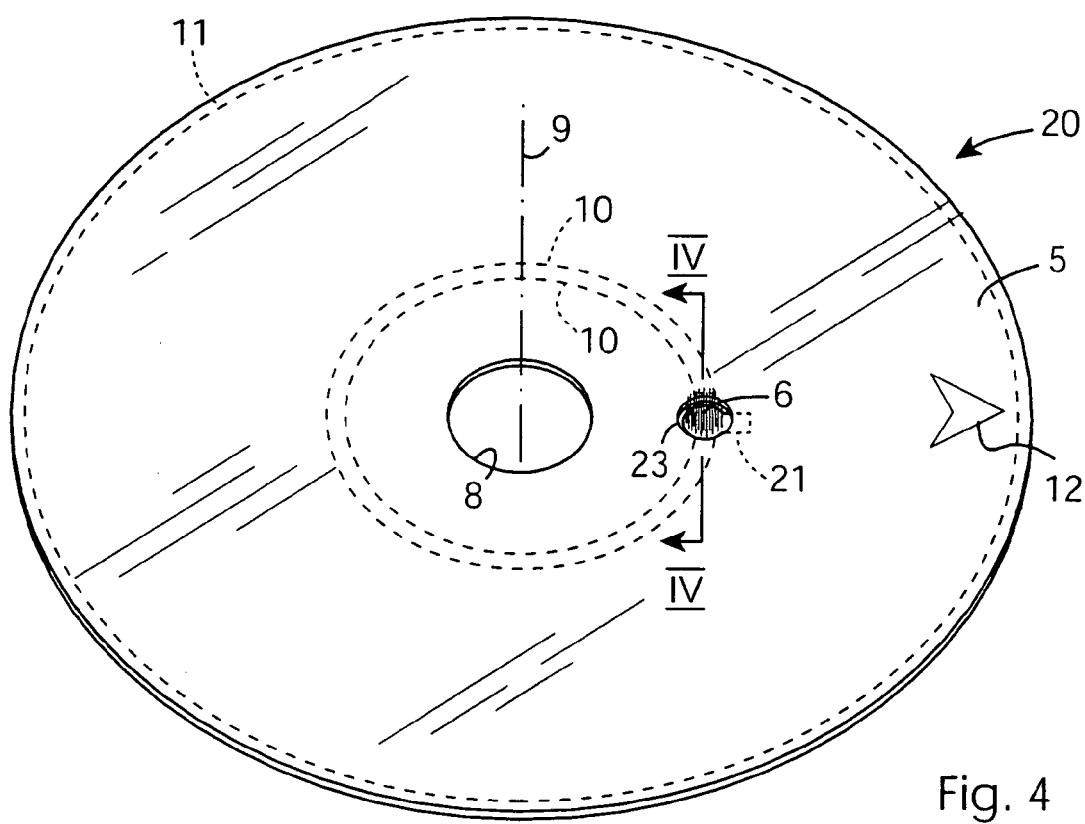
Fig. 4
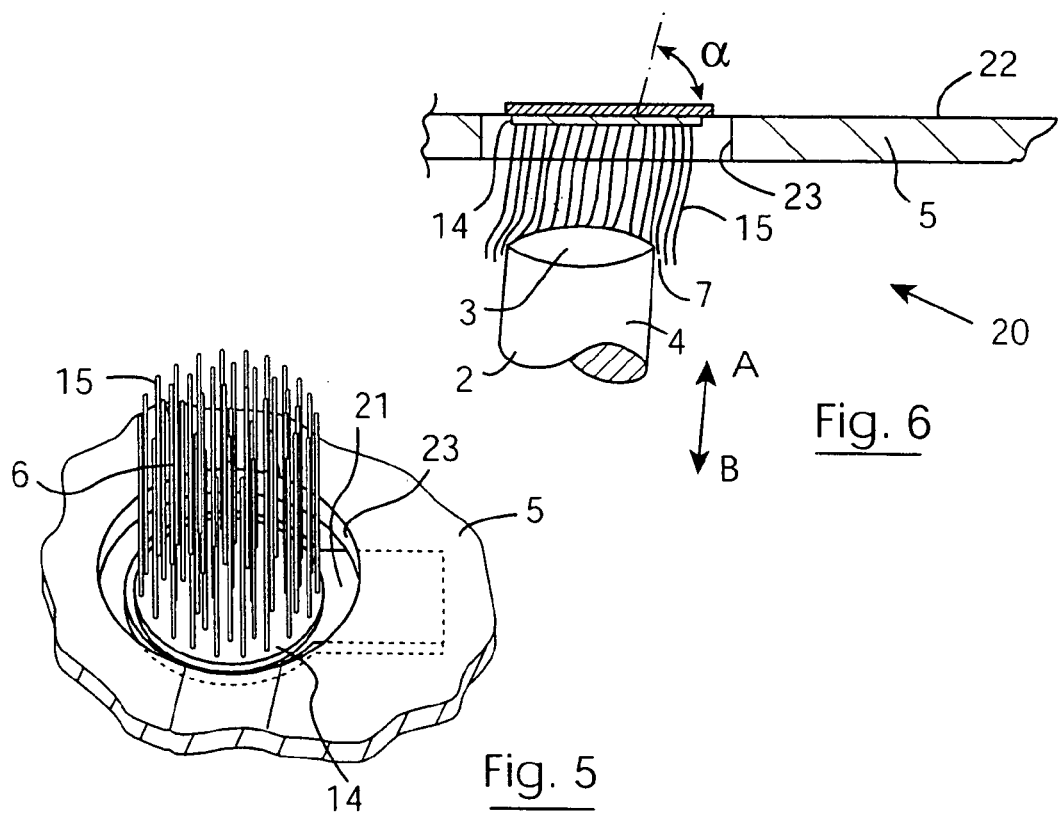
Fig. 6
Fig. 5

PROTECTIVE DEVICE

This is a Continuation Application of application Ser. No. 10/030,043 filed Jan. 7, 2002, now abandoned, the entire disclosure of which is incorporated herein by reference.

BACKGROUND OF THE INVENTION

The present invention relates to a protective device, and in particular, to a protective device for protecting an interface means, for example, a read and/or write head or a pin connector of a read and/or write unit of the type in which the interface means is provided for reading and/or writing data to or from a data carrier, such as, for example, a floppy disc, an optical disc, a data cartridge unit or an integrated circuit chip of the type which, for example, stores computer games and the like.

In this specification the term read and/or write unit is used to include at least the following within its meaning, an optical disc drive unit, for example, a music compact disc player and/or recorder unit, a CD ROM read and/or write drive unit, a floppy disc drive, a tape drive unit, for example, a magnetic tape drive unit, such as, a tape cassette player and/or recorder unit, or a tape cassette read and/or write unit, a data cartridge tape drive unit, and a read and/or write unit of the type adapted to read and/or write, but in particular to read an integrated chip in which a computer game is stored. The term interface means is used in this specification to mean any type of interface which interfaces with a data carrier in a read and/or write unit for reading from and/or writing to the data carrier. Such interface means would at least include a read and/or write head, which may be a magnetic head or an optical head, or a combination of both. Such interface means would also include a pin and/or socket connector for connecting to a corresponding pin and/or socket connector of an integrated circuit chip of the type on which a computer game is stored. Such read and/or write units typically are provided with a receiving area for receiving the data carrier which may be, for example, a floppy disc, an optical disc, a tape cassette or a data carrier tape cassette, or an integrated circuit chip housed in a housing with a pin and/or socket connector. The interface means, typically is located in or adjacent the receiving area for interfacing with the data carrier for in turn reading and/or writing data to or from the data carrier. Such read and/or write units may be suitable for receiving data carriers on which the data is stored in digital and/or analogue form and may be for music and/or computer data, or otherwise.

Such read and/or write units are well known. As discussed above, the interface means, typically, a read and/or write head or a pin and/or socket connector are located in or adjacent the receiving area for receiving the data carrier. In general, the read and/or write head of such units, or pin and/or socket connector are relatively fragile components and are easily damaged by, for example, shock and the like. Additionally, if the interface means of such read and/or write units become soiled with dust or dirt, in general they become inoperable. Because of the construction of many such read and/or write units, dust and dirt can readily easily collect on the interface means, and in particular, can collect on the interface means when the read and/or write unit is not in use.

While cleaning devices are known for cleaning read and/or write heads of such units when the read and/or write units are operational, there are no protective devices which satisfactorily protect the read and/or write head when the read and/or write unit is not in use. In particular, there are no protective devices which satisfactorily protect the read and/or write head from dust and/or dirt when the read and/or write unit is not in use.

There is therefore a need for a protective device which protects an interface means of the type hereinbefore defined of a read and/or write unit of the type hereinbefore defined from dirt and dust when the read and/or write unit is not in use. It is also desirable, that the protective device should protect the interface means from shock when the read and/or write unit is not in use.

The present invention is directed towards providing such a protective device.

SUMMARY OF THE INVENTION

According to the invention there is provided a protective device for protecting an interface means of the type hereinbefore defined of a read and/or write unit of the type hereinbefore defined, the read and/or write unit comprising a receiving area for receiving a data carrier, the interface means being located in or adjacent the receiving area for interfacing with the data carrier for reading from and/or writing to the data carrier, wherein the protective device comprises a carrier means for engaging in the receiving area of the read and/or write unit, and a protecting means carried on the carrier means for engaging the interface means for protecting the interface means when the carrier means is engaged in the receiving area.

In one embodiment of the invention the protecting means is located on the carrier means at a position which when the carrier means is located in the receiving area coincides with an inoperative position of the interface means, and/or a position at which the interface means expects to find directory or other relevant data on a data carrier.

Preferably, the protecting means engages the interface means with a portion of the interface means nested into the protecting means. Advantageously, the area of the protecting means offered up to the interface means is at least of area similar to the area of the portion of the interface means to be nested into the protecting means. Ideally, the area of the protecting means offered up to the interface means is greater than the area of the portion of the interface means to be nested into the protecting means. Preferably, the area of the protecting means offered up to the interface means is such that the protecting means embraces a peripheral portion extending around the portion of the interface means to be nested into the protecting means.

In one embodiment of the invention the protecting means is resilient.

In another embodiment of the invention the protecting means comprises a plurality of fibres extending from the carrier means for engaging the interface means. Preferably, the fibres of the protecting means are flexible. Advantageously, the fibres of the protective device are resilient. Ideally, the fibres of the protecting means are provided in the form of a brush. Advantageously, the fibres of the protecting means extend from a base member mounted on the carrier means.

In one embodiment of the invention a resilient mounting means is provided for resiliently mounting the base member of the protecting means to the carrier means.

In another embodiment of the invention the carrier means defines a central axis for in use coinciding with a rotational axis of a data carrier in the receiving area.

In a further embodiment of the invention the carrier means defines a carrier plane, and the fibres of the protecting means extend from the carrier means at an angle to the carrier plane of less than 90°. Advantageously, the fibres of the protecting means extend from the carrier means at an angle to the carrier plane in the range of 20° to 80°. Preferably, the fibres of the protecting means extend from the carrier means at an angle to the carrier plane in the range of 50° to 80°. Ideally, the fibres of the protecting means extend from the carrier means in a direction circumferentially relative to the central axis defined by the carrier means.

In one embodiment of the invention the protecting means extends circumferentially around the central axis defined by the carrier means.

In another embodiment of the invention the protecting means extends completely around the central axis defined by the carrier means.

Ideally, the protecting means is spaced apart from the central axis defined by the carrier means.

In one embodiment of the invention the protecting means protects the interface means from dirt and dust.

In another embodiment of the invention the protecting means protects the interface means from shock.

In one embodiment of the invention an indicating means is provided for indicating the direction in which the carrier means is to be inserted in the receiving area of the read and/or write unit. Preferably, the indicating means is provided on the carrier means. Advantageously, the indicating means facilitates alignment of the protecting means with the interface means.

In a further embodiment of the invention the protecting means is located on the carrier means for cleaning the interface means as the carrier means is being inserted in the receiving area.

In one embodiment of the invention the protecting means is located on the carrier means for cleaning the interface means when the read/write unit is activated for reading or writing data, and the interface means is being initially moved for identifying data.

In another embodiment of the invention the carrier means is provided for engaging in a disc receiving area of a disc drive read and/or write unit, and the protecting means is provided for protecting a read and/or write head forming the interface means of the read and/or write unit.

In a further embodiment of the invention the protecting means cleans the read and/or write head of the disc drive read and/or write unit as the read and/or write head is being initially moved for identifying data.

In a still further embodiment of the invention the protecting means cleans the read and/or write head of the disc drive read and/or write unit as the read and/or write head is being moved substantially perpendicularly relative to the carrier means into and out of the protecting means.

In a further embodiment of the invention the protecting means is for protecting a read and/or write head provided by an optical head.

In one embodiment of the invention the protecting means is for engaging a lens of the read and/or write optical head. Alternatively, the protecting means is for protecting a read and/or write head provided by a magnetic head.

Additionally, the invention provides a method for protecting an interface means of the type hereinbefore defined of a read and/or write unit of the type hereinbefore defined in which the read and/or write unit comprises a receiving area for receiving a data carrier, and the interface means is located in or adjacent the receiving area, the method comprising the steps of inserting a carrier means having a protecting means mounted thereon into the receiving area of the read and/or write unit, and engaging the protecting means with the interface means when the carrier means is engaged in the receiving area for protecting the interface means.

In one embodiment of the invention the protecting means protects the interface means from dirt and/or dust.

In another embodiment of the invention the protecting means protects the interface means from shock.

In a further embodiment of the invention the protecting means cleans the interface means as the carrier means is being inserted into the receiving area.

In a still further embodiment of the invention the protecting means cleans the interface means when the interface means has been activated to identify data, and advantageously, the protecting means cleans the interface means when the interface means is being initially moved perpendicularly relative to the carrier means into and out of the protecting means for identifying data.

The invention further provides a method for protecting an interface means of the type hereinbefore defined of a read and/or write unit of the type hereinbefore defined in which the read and/or write unit comprises a receiving area for receiving a data carrier, and an interface means is located in or adjacent the receiving area, the method comprising the steps of inserting the carrier means of the protective device according to the invention into the receiving area of the read and/or write unit, and engaging the protecting means with the interface means when the carrier means is inserted in the receiving area for protecting the interface means.

In one embodiment of the invention the read and/or write unit is a disc drive read and/or write unit, and the interface means is a read and/or write head.

In another embodiment of the invention the read and/or write head is an optical head. Alternatively, the read and/or write head is a magnetic head.

In a still further embodiment of the invention the method further comprises activating the read and/or write unit for causing the interface means to cycle perpendicularly relative to a plane defined by the carrier means for cycling the interface means into and out of the protecting means for cleaning the interface means.

Additionally, the invention provides a cleaning device for protecting an interface means of the type hereinbefore defined of a read and/or write unit of the type hereinbefore defined, the read and/or write unit comprising a receiving area for receiving a data carrier, the interface means being located in or adjacent the receiving area for interfacing with the data carrier for reading from and/or writing to the data carrier, wherein the cleaning device comprises a carrier means for engaging in the receiving area of the read and/or write unit, and a cleaning means carried on the carrier means for alignment with the interface means when the carrier means is located in the receiving area so that movement of the interface means when the read and/or write unit is activated for identifying data the interface means is moved into and out of the cleaning means for cleaning the interface means.

Further the invention provides a method for cleaning an interface means of the type hereinbefore defined of a read and/or write unit of the type hereinbefore defined in which the read and/or write unit comprises a receiving area for receiving a data carrier, and the interface means is located in or adjacent the receiving area, the method comprising the steps of inserting a carrier means having a cleaning means mounted thereon into the receiving area of the read and/or write unit with the cleaning means aligned with the interface means when the carrier means is engaged in the receiving area, and activating the read and/or write unit for causing the interface means to move relative into and out of the cleaning means for identifying data for cleaning the interface means.

The advantages of the invention are many. By virtue of the fact that the protecting means engages the interface means of a read and/or write unit when not in use where the protective device is adapted for protecting against dirt and dust the protective device protects the area of the interface means which is engaged by the protecting means against dirt and dust over the entire period while the protective device is located in the receiving area of the read and/or write unit. Additionally, where the protective device is adapted for protecting the interface means against shock, while the protective device is located in the receiving area of the read and/or write unit the interface means is protected by the protecting means against shock. A further advantage of the invention is achieved when the protecting means is provided with a cleaning action, in that the protective device as well as protecting the interface means against shock and/or dirt and dust also tends to clean the portion of the interface means engaged by the protecting means.

The provision of the protecting means in the form of a brush provides a particularly desirable form of the protective device in that as well as protecting against dirt and dust, the protective device also acts to clean the interface means as the protecting means is passed relative to the interface means on being inserted into or ejected from the receiving area of the read and/or write unit. Indeed, by providing the brush of the protecting means with sufficient resilience the protective device has the further advantage of protecting the interface means against shock.

A further advantage of the invention is that it is particularly suitable for cleaning the head, and in particular, an optical head of a disc drive unit where the optical head is particularly dirty. By virtue of the fact that the only relative movement required between the head and the protecting means when the disc drive unit is activated is the movement of the head during its focusing cycles, the disc drive unit may be operated a sufficient number of times until the head has been cleaned. This is a particularly important advantage over and above those cleaning devices in which relative lateral movement, namely, relative radial and circumferential movement between the head and a cleaning means on a carrier means is required, since in many disc drive units the head of the disc drive unit will not move radially from its inactive position until data has been found on the inner data track of a CD ROM or music CD disc, or the like. Additionally, in some disc drive units the CD ROM or music CD will not commence to rotate in the event that the lens of the optical head is so dirty as to prevent any reading of data whatsoever. Essentially the device according to the invention acts as a stationary cleaning device, in other words the device cleans the interface means without movement of the device being required.

For example, when the device is adapted for protecting and/or cleaning an optical head of a disc drive unit rotation of the carrier means is not required. Cycling movement of the optical head for focusing the head is sufficient for obtaining cleaning of the optical head and/or the lens of the optical head.

BRIEF DESCRIPTION OF THE DRAWINGS

The invention will be more clearly understood from the following description of some preferred embodiments thereof which are given by way of example only with reference to the accompanying drawings, in which:

FIG. 1 is a perspective view of a protective device according to the invention for protecting an interface means, namely, a read and/or write head of a read and/or write unit, namely, a disc drive unit, FIG. 2 is an enlarged perspective view of a portion of the protective device of FIG. 1, FIG. 3 is a transverse cross-sectional side elevational view of a portion of the protective device of FIG. 1 on the line III-III of FIG. 1 illustrated in use, FIG. 4 is a perspective view of a protective device according to another embodiment of the invention for protecting a read write head of a read write unit, FIG. 5 is an enlarged perspective view of a portion of the protective device of FIG. 4, FIG. 6 is a transverse cross-sectional side elevational view of a portion of the protective device of FIG. 4 on the line VI-VI of FIG. 4 illustrated in use.

DETAILED DESCRIPTION OF THE INVENTION

Figure 7:
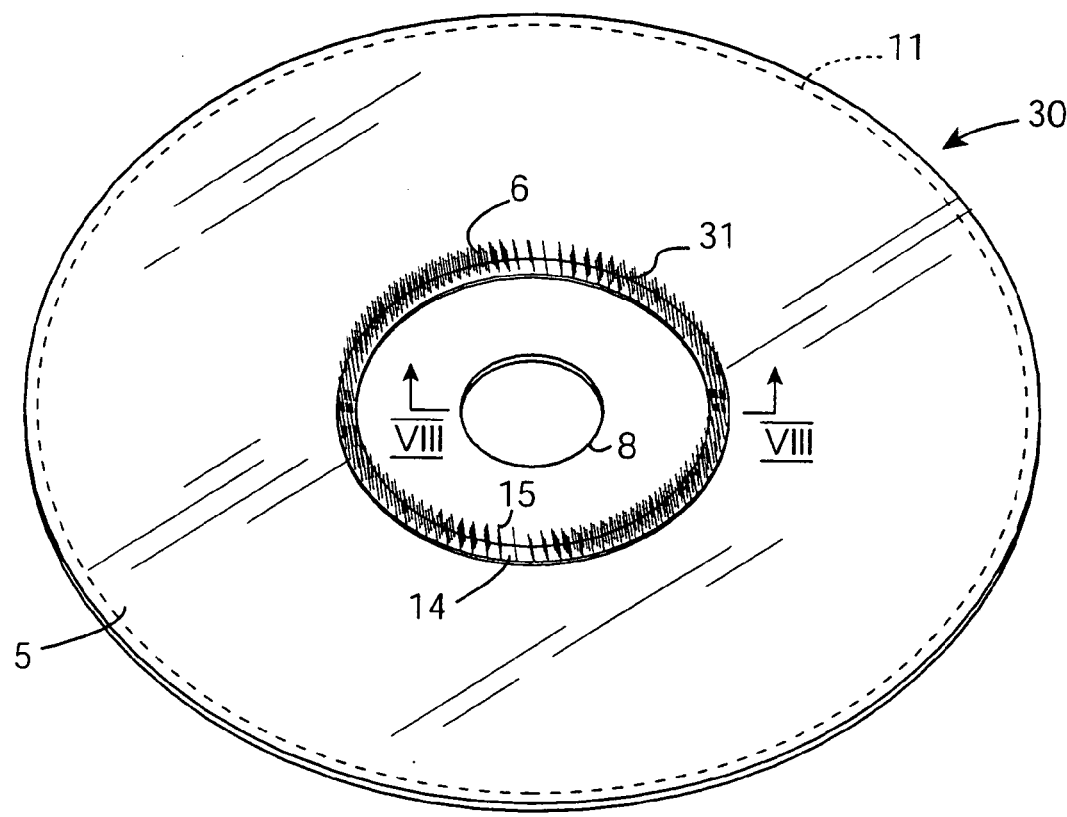
FIG. 7 is a perspective view of a protective device according to a further embodiment of the invention for protecting a read/write head of a read and/or write unit.

Referring to the drawings and initially to FIGS. 1 to 3, there is illustrated a protective device according to the invention indicated generally by the reference numeral 1 for protecting an interface means, in this embodiment of the invention a read and/or write optical head 2 of a read and/or write unit, namely, a music CD disc drive unit (not shown) such as a music compact disc player and/or recorder unit. The protective device 1 protects a lens 3 in a lens carrier 4 of the head 2 from dust and dirt, and also protects the head 2 from shock when the disc drive unit is not in use. Only the lens 3 and a portion of the lens carrier 4 of the head 2 are illustrated schematically in FIG. 3. The protective device 1 also acts as a cleaning device for cleaning the lens 3 of the read and/or write head 2 as will be described below. The protective device 1 comprises a carrier means, namely, a carrier disc 5 which is similar in size and shape to a music CD disc for engaging in a disc receiving area (not shown) of the disc drive unit. A protecting means for protecting the read and/or write head 2 comprises a brush member 6 for engaging the lens 3 of the read and/or write head 2 as well as a peripheral portion 7 of the lens carrier 4, which extends around the lens 3 adjacent the lens 3 for protecting the lens 3 against dust and dirt, and for protecting the head 2 against shock. The brush member 6 is carried on and secured to the carrier disc 5 by any suitable securing means, in this case, an adhesive.

The carrier disc 5 is provided with a central opening 8, similar to the central opening of a music CD disc, and defines a central axis 9 which when the carrier disc 5 is inserted in the disc receiving area of the disc drive unit coincides with the rotational axis of a music CD disc when similarly inserted in the disc drive unit. The bush member 6 is located at a position radially spaced apart from the central axis 9 of the carrier disc 5 which coincides with the inner data track of a music CD disc so that when inserted in the disc receiving area of the disc drive unit the brush member 6 lies on substantially the same radius as the head 2 when the head 2 of the disc drive unit is in the inactive position. The normal inactive position of an optical head of disc drive unit is aligned with the position of the inner data track of a music CD disc. The normal location of the inner data track of a music CD disc is indicated on the carrier disc 5 in FIG. 1 by the broken lines 10. A broken line 11 indicates the outer periphery of the area in which data is written on a music CD disc.

An indicating means provided by an arrow head 12 is printed or otherwise formed on the carrier disc 5 for indicating the direction in which the carrier disc 5 should be entered in the disc drive unit and how the carrier disc should be aligned with the disc receiving area, so that when the carrier disc 5 is fully inserted in the receiving area of the disc drive unit the brush member 6 is substantially centrally aligned with the head 2. In this embodiment of the invention the arrow head 12 is located for alignment with a head accommodating slot in a CD disc receiving tray for receiving and carrying the CD disc into the disc receiving area of the disc drive unit. Such disc receiving trays of disc drive units will be well known to those skilled in the art.

The brush member 6 comprises a base member 14, which in this embodiment of the invention is provided by woven sheet material, into which fibres 15 of the brush member 6 are woven and extend therefrom at an angle $\alpha$ of approximately 80° to the carrier disc 5. The fibres 15 in extending from the carrier member 5 at the angle $\alpha$ of 80° extend in a direction generally circumferentially relative to the central axis 9 for causing the fibres 15 to engage the lens 3 with a wiping, scouring action as the brush member 6 passes the lens 3 as the carrier disc 5 is being engaged in the disc receiving area of the disc drive unit for cleaning the lens 3. The fibres 15 are flexible, but are also resilient for resiliently engaging the lens 3 and the peripheral portion 7 of the lens carrier 4 of the head 2. The base member 14, and in turn the brush member 6 when viewed in plan are of rectangular shape, in this embodiment of the invention 20 mm by 10 mm. The base member 14 is secured to the carrier disc 5 with the longer dimension, namely, the 20 mm sides extending circumferentially relative to the central axis 9 of the carrier disc 5, and the short dimension, namely, the 10 mm sides extending radially relative to the central axis 9 of the carrier disc 5. In general, the diameter of a lens of a read and/or write optical head 2 is in the order of 5 mm to 6 mm diameter, and accordingly, the area of the brush member 6 when viewed in plan is considerably greater than the area of the lens 3, similarly, when viewed in plan. The fact that the area of the brush member 6 in plan view is significantly greater than the area of the lens 3 reduces the need for precise alignment of the brush member 6 with the lens 3. Furthermore, the fact that the brush member 6 is twice the length in a circumferential direction than in a radial direction relative to the central axis 9 of the carrier disc 5 avoids the need for precise circumferential alignment of the brush member 6 with the head 2.

Additionally, the fibres 15 of the brush member 6 are of length so that when the protective device 1 is inserted in the disc receiving area of the read and/or write unit in the direction of the arrow head 12, and when the head 2 is in the inactive position, the fibres 15 of the brush members 6 engage the lens 3, and furthermore, the lens 3 and a peripheral portion 7 of the lens carrier 4 around the lens 3 nests into the brush member 6, as can most clearly be seen in FIG. 3. This nesting effect of the head 2 into the brush member 6 has the dual effect of protecting the lens 3 and the peripheral portion 7 of the head 2 from dust and dirt while the disc drive unit is not in use, and also for protecting the head 2 against shock.

In this embodiment of the invention the fibres 15 of the brush member 6 are formed by picks or tufts, each of which comprises a plurality of texturised filaments of polyamide— 6.6, and filament diameter 2.2 DTEX ("denier"). Typically, each pick or tuft is made up of approximately fifty filaments which are grouped together, and may be twisted together. The brush member 6 comprises one pick or tuft per square millimeter. The texturizing of the filaments is carried out by heating, and provides the filaments, and in turn the picks or tufts of fibres 15 with an inherent resilience which is sufficient for providing adequate shock protection for the head 2 when the head 2 is engaged by the brush member 6. The resilience of the fibres 15 also enhances the cleaning action of the brush member 6 on the lens 3 as the brush member 6 is being wiped past the lens 3 on insertion in the disc receiving area.

The length of the fibres 15 depends on the type of disc drive unit, and the read and/or write head of which is to be protected. However, ideally, the length of the fibres 11 should be such as to allow at least 0.5 to 2 mm of projection of the fibres beyond the lens 3, to ensure that the lens 3 and the peripheral portion 7 of the head 2 adjacent the lens 3 are properly nested into the brush member 6.

In use, the protective device 1 is placed on the disc receiving tray of the disc drive unit with the arrow head 12 aligned with the head accommodating slot in the disc receiving tray. The disc drive unit is then activated for drawing the disc receiving tray, and in turn the device 1 into the disc receiving area of the disc drive unit. On the carrier disc 5 being fully drawn into the disc receiving area the brush member 6 is aligned with the head 2 of the disc drive unit when the head 2 is in the inactive position. As the carrier disc 5 is approaching its fully inserted position into the disc receiving area the brush member 6 wipes across the lens 3 of the head 2, and also the brush member 6 wipes the peripheral portion 7 of the lens carrier 4, thereby causing a cleaning action for cleaning the lens 3 and the peripheral portion 7 of the lens carrier 4. When the carrier disc 5 is fully inserted in the disc receiving area, the head 2 in its inactive position engages and nests within the brush member 6 so that the lens 3 and the peripheral portion 7 of the lens carrier 4 are embraced by the fibres 15 of the brush member 6 for protecting the lens 3 and the peripheral portion 7 of the lens carrier 4 against dirt and dust, and also for protecting the head 2 against shock.

A further cleaning action may be achieved by operating the disc drive unit when the carrier disc 5 is inserted in the disc receiving area and the brush member 6 is aligned with the head 2. On activation of disc drive unit the head 2 commences to cycle upwardly and downwardly in the directions of the arrows A and B perpendicularly relative to a plane defined by the carrier disc 5, and this upward and downward cycling movement of the head 2 causes the lens 3 and the peripheral portion 7 of the lens carrier 4 to be urged repeatedly inwardly into and outwardly from the brush member 6. This in and out cycling movement of the head 2 into and out of the brush member 6 causes the fibres 15 to wipe the lens 3 and the peripheral portion 7 of the lens carrier 4, thereby further cleaning the lens 3 and the peripheral portion 7 of the lens carrier 4. This inward and outward cycling movement of the head 2 is undertaken by the disc drive unit when the disc drive unit is powered up for causing the head 2 to focus on the data on the inner data track. By virtue of the fact that the brush member 6 is in engagement with the head 2 the head 2 fails to identify data and continues to cycle inwardly and outwardly of the brush member 6 a number of times in an attempt to focus on data. However, after a number of repeated inward and outward cycles of the head 2 into and out of the brush member 6 the disc drive unit shuts down. This part of the operation of a disc drive unit will be well known to those skilled in the art.

Typically, the cycling of the head 2 into and out of the brush member 6 for focusing the head 2 continues for a number of focusing cycles. The number of focusing cycles depends on the particular type of disc drive unit. However, in general, the read and/or write head of a music CD disc drive unit would cycle into and out of the cleaning brush for at least four cycles, and in many cases more than four cycles. In general, four focusing cycles of the head 2 into and out of the brush member 6 is sufficient for cleaning a moderately dusty lens. However, if the lens is heavily soiled, the disc drive may be activated a number of times so that each time the disc drive unit is activated the lens will cycle for the appropriate number of focusing cycles into and out of the brush member 6.

Additionally, in certain cases if desired a cleaning fluid which preferably, is a relatively volatile fluid may be applied to brush member 6 for further enhancing the cleaning action of the brush member 6.

Typically, when the disc drive unit is not in use the protective device 1 is inserted into the disc receiving area for protecting the head of the disc drive unit. When it is desired to use the disc drive unit, the disc drive unit is operated for ejecting the protective device 1. However, in general, it is desirable that the disc drive unit should be activated when the protective device 1 is inserted for cleaning the lens, and may also be activated prior to ejection of the protective device 1 for also cleaning the head.

Referring now to FIGS. 4 to 6 there is illustrated a protective device according to another embodiment of the invention indicated generally by the reference numeral 20 also for protecting a lens 3 and a read and/or write head 2 of a music CD disc drive unit. The protective device 20 is substantially similar to the protective device 1 and similar components are identified by the same reference numerals. The main difference between the protective device 20 and the protective device 1 is that instead of the brush member 6 being mounted directly onto the carrier disc 5, the brush member 6 is carried on a resilient mounting means, namely, a resilient carrier arm 21 of plastics material which is secured to the carrier disc 5 by adhesive. The carrier arm 21 is secured to a rear surface 22 of the carrier disc 5, and an circular opening 23 is provided in the carrier disc 5 for accommodating the fibres 15 of the brush member 6 therethrough. Additionally, in this embodiment of the invention the brush member 6 instead of being of rectangular shape in plan view is of circular shape. The provision of the carrier arm 21 of a resilient material, further enhances the resilient action of the brush member 6 on the head 2 for enhancing protection of the head 2 against shock.

Otherwise, the protective device 20 is similar to the protective device 1 and its use is likewise similar.

Figure 8:
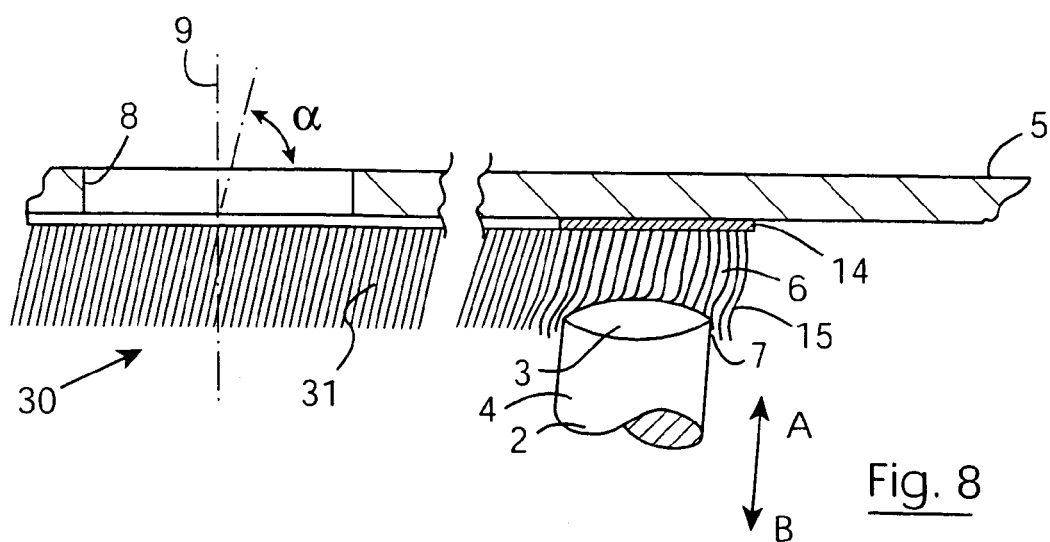
FIG. 8 is a transverse cross-sectional side elevational view of a portion of the protective device of FIG. 7 on the line VIII-VIII of FIG. 7 illustrated in use.

Referring now to FIGS. 7 and 8 there is illustrated a protective device according to a further embodiment of the invention indicated generally by the reference numeral 30 also for protecting a lens 3 and a read and/or write head 2 of a read and/or write music CD disc drive unit. The protective device 30 is substantially similar to the protective device 1 and similar components are identified by the same reference numerals. The main difference between the protective device 30 an the protective device 1 is that the brush member 6 instead of being provided in a rectangular or circular shape is provided in the form of an annular ring 31 which extends circumferentially around and concentrically with the central axis 9 of the carrier disc 5, and coincides with the inner data track of a music CD disc. The advantage of providing the brush member 6 to extend in the form of the annular ring 31 avoids any danger of misalignment of the brush member with the head 2.

In this embodiment of the invention the fibres 15 extend from the base member 14 at an angle α of approximately 80° in a general direction circumferentially relative to the central axis 9 in similar fashion as the fibres 15 extend from the base member 14 of the brush 6 of the protective device 1.

Otherwise, the protective disc 30 is similar to the protective disc 1, and its operation is likewise similar.

While the protective devices have been described for protecting the read and/or write head against both shock and dust and dirt, it is envisaged that in certain cases the protective devices may be provided for protecting against one or the other, in other words, for protecting the head against either shock or dust and dirt. Additionally, while the protective device according to the invention has been described as also having a cleaning action, while this is preferable, it is not essential.

While the brush members have been described as being surface mounted directly onto the carrier disc of the protective devices 1 and 30 of FIGS. 1 to 3 and 7 and 8, it is envisaged that the base members of the brush members may be recess mounted into recesses in the carrier disc. Additionally, it is envisaged that the brush members may be mounted onto the carrier disc on resilient blocks.

While it is desirable, it will be appreciated that it is not essential that the carrier means should be similar in shape and size to a data carrier of the type used with the read and/or write unit, the carrier means may be of any desired or suitable shape. Additionally, it will be appreciated that the central opening in the carrier means may be of any desired or suitable size, and need not necessarily be of size similar to that of a central opening of a data carrier of the type used with the read and/or write unit. Indeed, in certain cases it may be desirable that the central opening should be of diameter greater than that of a normal central opening of the appropriate data carrier. Indeed, in the case of a DVD read and/or write unit in order to avoid the carrier disc rotating, it may be desirable to provide the central opening in the carrier disc of diameter greater than the diameter of a central opening of a DVD for avoiding engagement of the DVD drive with the carrier disc.

Needless to say, it is envisaged that in certain cases, the protective device may be required for protecting an optical head of a disc drive unit in which the optical head is provided with more than one lens, for example, a pair of adjacent lenses, in such cases, it will be appreciated that the area of the protecting means will be such as to cover the part of the head which is to be protected and to cover the two or more lenses.

While the protective device according to the invention has been described for protecting a read/write head of a music CD disc drive unit from shock, dust and dirt, and also for cleaning the read and/or write head of a music CD disc drive unit, it is envisaged that the protective device may be used for protecting and/or cleaning the head or indeed any other interface means for interfacing with a data carrier of any other read and/or write unit. For example, the protective device may be used for protecting and/or cleaning the read and/or write head of any of the following read and/or write units, CD ROM read and/or write units, digital video disc (DVD) player and/or recorder units, CD interactive drive units, Zip drive units, Jazz drive units, super disc drive units, floppy disc drive units, mini disc drive units, digital camcorders, digital cameras, audio tape drive units, data cartridge drive units, and any other read and/or write units. Where the protective device is adapted for protecting and/or cleaning the interface means of any of these read and/or write units, preferably an appropriate sized and shaped carrier mean will be provided for engaging in the data carrier receiving area of the read and/or write unit. Needless to say, the brush member will also be appropriately sized, shaped and located for engaging the portion of the interface means to be protected and nested into the brush member.

The protective device according to the invention may also be adapted for protecting a multi pin plug or socket connector in a data carrier receiving area of a read write unit of the type for receiving a data carrier cassette in which the data is stored on an integrated chip. In which case it is preferable that the carrier means would be of a shape and size corresponding to the data carrier cassette and the protecting means would be mounted on the carrier means at an appropriate location for engaging the multi pin connector.

It will of course be appreciated that any other suitable protecting means may be provided besides a brush member for protecting the read/write head and/or other interface means from shock, dust and dirt. An advantage of providing the protecting means by way of a brush member is that the protective device as well as acting as a protective device also acts as a cleaning device for cleaning the lens and/or any other component of the interface means of the read and/or write unit. However, where it is desired to provide the protective device as a protective device for protecting the interface means against dirt and dust only, the resilience of the fibres of the brush member, or its resilient mounting is not as important as when it is desired that the protective device should protect the interface means against shock. The more shock protection which is required, the more resilient should be the fibres of the brush member, and/or the more resilient should be the mounting of the brush member on the carrier disc. Additionally, where it is desired to provide the protective device as a protective device against shock only, the size and area of the protecting means and in particular, its area relative to the interface means is not particularly critical, provided that its shape and area are sufficient for engaging the interface means for protecting against shock. However, where the protective device is to protect against dust and dirt, it is important that the area of the protecting means offered up to the interface means should be such as to at least cover the area of the interface means to be protected against dust and dirt.

While the fibres of the brush member have been described as comprising a plurality of texturised filaments, it is envisaged that the fibres may be formed in other ways and when formed by filaments, it is not essential that the filaments be texturised.

While the indicating means has been described as being provided by an arrow head, any other suitable indicating means for indicating how the device is to be entered in the disc receiving area may be provided in disc drive units where a CD disc is entered manually into a slot and is then subsequently drawn through the slot by the disc drive unit into the disc receiving area, it is envisaged that the indicating-means may be provided by an arrow head, which would indicate the portion of the carrier disc to be initially entered in the slot, and the orientation of the disc relative to the slot. Additionally, in some disc drive units a specific indicating means may not be required due to the fact that the shape of the carrier means may facilitate self-alignment.

What is claimed is:

1. A protective device for protecting an interface means of a read and/or write head of a read and/or write unit from dirt, dust and shock when the read and/or write unit is not in use, the read and/or write unit comprising a receiving area for receiving a data carrier, the read and/or write head being located in or adjacent the receiving area for interfacing with the data carrier for reading from and/or writing to the data carrier, the protective device comprising:

a carrier means for inserting and locating in the receiving area of the read and/or write unit, a resilient protecting means carried on the carrier means for protecting the interface means of the read and/or write head against dirt, dust and shock, the protecting means comprising a base member and a plurality of fibres extending from the base member for engaging the interface means, and a resilient mounting means resiliently mounting the base member on the carrier means with the fibres extending from the carrier means at a location which coincides in use with an inoperative position of the interface means, and the protecting means being of area when viewed in plan, so that when the read and/or write head is in the inoperative position with the read and/or write unit deactivated, the fibres of the protecting means engage and embrace the interface means with the interface means nesting in the fibres for protecting the interface means from dirt, dust and shock when the read and/or write unit is not in use.

2. A protective device as claimed in claim 1 in which the area of the protecting means offered up to the interface means is greater than the area of the interface means.

3. A protective device as claimed in claim 1 in which the fibres of the protecting means are flexible.

4. A protective device as claimed in claim 1 in which the fibres of the protecting means are provided in the form of a brush.

5. A protective device as claimed in claim 1 in which the carrier means defines a central axis for in use coinciding with a rotational axis of a data carrier in the receiving area, and the carrier means defines a carrier plane, and the fibres of the protecting means extend from the carrier means at an angle to the carrier plane of less than 90°.

6. A protective device as claimed in claim 5 in which the fibres of the protecting means extend from the carrier means in a direction circumferentially relative to the central axis defined by the carrier means.

7. A protective device as claimed in claim 5 in which the protecting means extends circumferentially completely around the central axis defined by the carrier means, and is spaced apart from the central axis defined by the carrier means.

8. A protective device as claimed in claim 1 in which an indicating means is provided on the carrier means for indicating the direction in which the carrier means is to be inserted in the receiving area of the read and/or write unit, and for facilitating alignment of the protecting means with the interface means of the read and/or write head.

9. A protective device as claimed in claim 1 in which the protecting means is located on the carrier means so that the protecting means engages the interface means for cleaning thereof as the carrier means is being inserted in the receiving area.

10. A protective device as claimed in claim 1 in which the protecting means is located on the carrier means so that when the read and/or write unit is activated for reading or writing data, and the interface means is being initially moved for identifying data the protecting means engages the interface means for cleaning thereof.

11. A protective device as claimed in claim 1 in which the protecting means is adapted for protecting a lens of a read and/or write optical head.

12. A protective device as claimed in claim 1 in which the carrier means is adapted for engaging in a disc receiving area of a disc drive read and/or write unit, and the carrier means comprises a carrier disc.

13. In combination a read and/or write unit comprising a receiving area for receiving a data carrier, and a read and/or write head being located in or adjacent the receiving area carrying an interface means for interfacing with the data carrier for reading from and/or writing to the data carrier, and a protective device as claimed in claim 1 located in the receiving area of the read and/or write unit with the read and/or write head in the inoperative position and the fibres of the protecting means engaging and embracing the interface means with the interface means nesting in the fibres for protecting the interface means from dirt, dust and shock.

14. A method for protecting an interface means of a read and/or write head of a read and/or write unit from dirt, dust and shock when the read and/or write unit is not in use, the read and/or write unit comprising a receiving area for receiving a data carrier, the read and/or write head being located in or adjacent the receiving area for interfacing with the data carrier for reading from and/or writing to the data carrier, the method comprising providing a carrier means for inserting and locating in the receiving area of the read and/or write unit, providing a resilient protecting means on the carrier means for protecting the interface means of the read and/or write head against dirt, dust and shock, the protecting means comprising a base member and a plurality of fibres extending from the base member for engaging the interface means, resiliently mounting the base member on the carrier means with the fibres extending from the carrier means at a location which coincides in use with an inoperative position of the interface means, providing the protecting means to be of area when viewed in plan, so that when the read and/or write head is in the inoperative position with the read and/or write unit deactivated, the fibres of the protecting means engage and embrace the interface means, and inserting the carrier means into the receiving area when the read and/or write head is in the inoperative position so that the fibres of the protecting means engage and embrace the interface means with the interface means nesting in the fibres for protecting the interface means from dirt, dust and shock when the read and/or write unit is not in use.

15. A method as claimed in claim 14 in which the fibres of the protecting means engage the interface means of the read and/or write head with a cleaning action as the carrier means is being inserted into the receiving area.

16. A method as claimed in claim 14 in which the read and/or write unit is activated for operating the read and/or write head to read and/or write data to the carrier means so that the read and/or write head is moved relative to the protecting means for cleaning the interface means.

* * * * *